United States Patent

[11] 3,580,362

| [72] | Inventor | Edward J. Falk<br>St. Louis, Mo. |
|------|----------|----------------------------------|
| [21] | Appl. No. | 846,721 |
| [22] | Filed | Aug. 1, 1969 |
| [45] | Patented | May 25, 1971 |
| [73] | Assignee | Wagner Electric Corporation<br>Newark, N.J. |

[54] DISC BRAKE
29 Claims, 8 Drawing Figs.

[52] U.S. Cl................................................... 188/73.4,
188/73.6, 188/71.4, 188/72.4
[51] Int. Cl................................................... F16d 55/224
[50] Field of Search..................................... 188/73.4,
73.6, 71.1, 71.4, 73, 72.4; 287/189.36 (F);
248/298

[56] References Cited
UNITED STATES PATENTS
3,464,523  9/1969  Machek........................ 188/73.4

*Primary Examiner*—Milton Buchler
*Assistant Examiner*—Stephen G. Kunin
*Attorney*—Joseph E. Papin

ABSTRACT: A disc brake having a rotatable disc with a support plate extending across substantially a chordal portion of said disc on which a closed loop member is movable, and actuating means for moving a friction element in one direction into frictional engagement with one side of said disc and for moving said closed loop member in the opposite direction to frictionally engage another friction element connected therewith with the other side of said disc. The support plate includes a pair of anchor means adjacent to said disc one side and embracing said first named friction element and a third anchor means adjacent to said disc other side and connected between said closed loop member and said support plate.

INVENTOR
EDWARD J. FALK
BY
Joseph E. Papin

INVENTOR
EDWARD J. FALK
BY
Joseph E. Pagin.

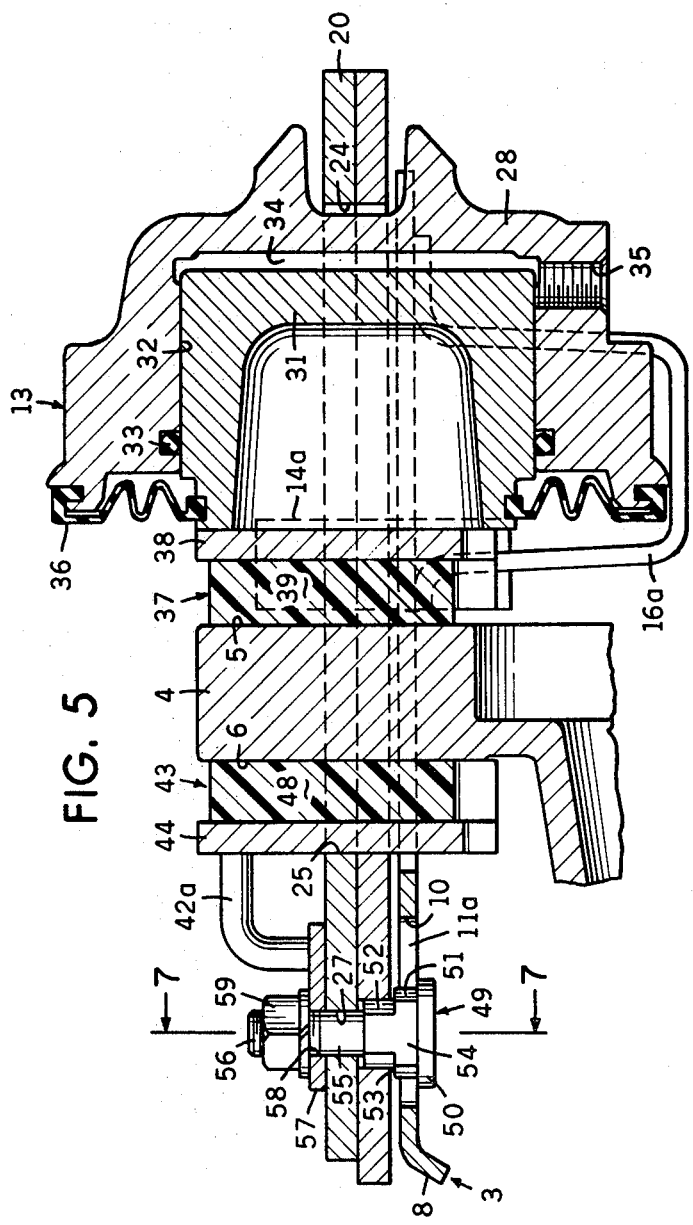
FIG. 5
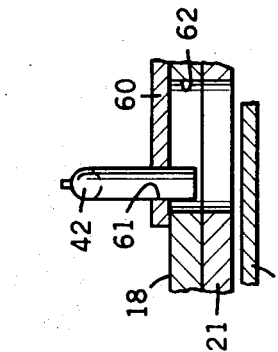
FIG. 8
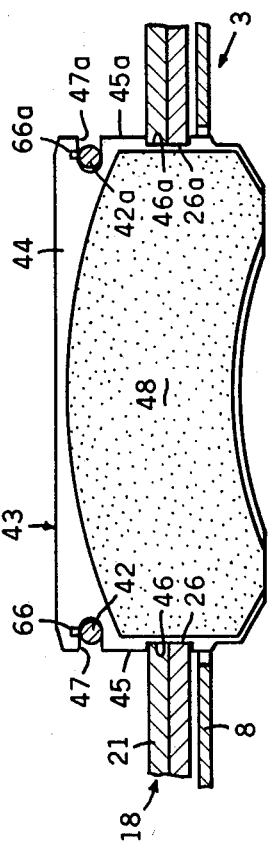
FIG. 6
FIG. 7
INVENTOR
EDWARD J. FALK
BY
Joseph E. Papin

DISC BRAKE

This invention relates to friction devices and in particular to disc brakes of the closed loop type.

In the past closed loop-type disc brakes, a brake actuator or wheel cylinder was utilized to move the inboard brake shoe in one direction into frictional engagement with the inboard side of a cooperating rotatable disc and to move the closed loop member in the opposite direction to frictionally engage an outboard brake shoe connected therewith with the outboard side of said disc. Supporting means was provided on which the closed loop member was movable, and spaced anchors were provided on said supporting means adjacent to the disc inboard side for receiving the braking torque transmitted thereto from the first named and other friction members. A disadvantageous or undesirable feature of such past closed loop-type disc brakes was that moments were produced due to the transfer of torque from the outboard shoe to the closed loop member which tended to rotate said closed loop member in its own plane, and such moments resulted in excessive tapered wear on the outboard shoe due to excessive freedom of angular movement or rotation of said closed loop member.

The primary object of the present invention is to provide a closed loop-type disc brake which overcomes the aforementioned disadvantageous or undesirable feature.

Another object of the present invention is to provide a closed loop-type disc brake having improved shoe retaining or holddown means.

These and other objects and advantageous features of the present invention will become apparent to those skilled in the art from the following specification with reference to the drawings wherein:

FIG. 5 is a sectional view taken along line 5–5 of FIG. 2;

FIG. 6 is a partial sectional view taken along line 6–6 of FIG. 2;

FIG. 7 is an enlarged partial sectional view taken along line 7–7 of FIG. 5; and FIG. 8 is an enlarged partial sectional view taken along line 8–8 of FIG. 2.

Figure 1:
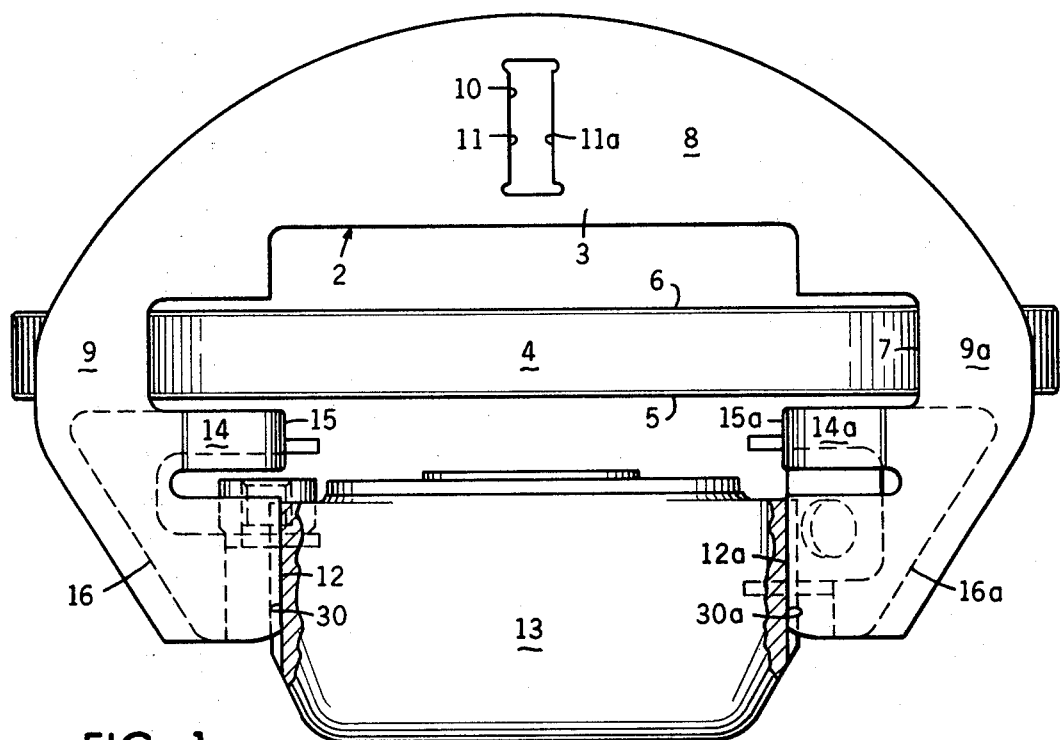
FIG. 1 is a partial plan view illustrating the support member of a disc brake embodying the present invention.
Figure 4:
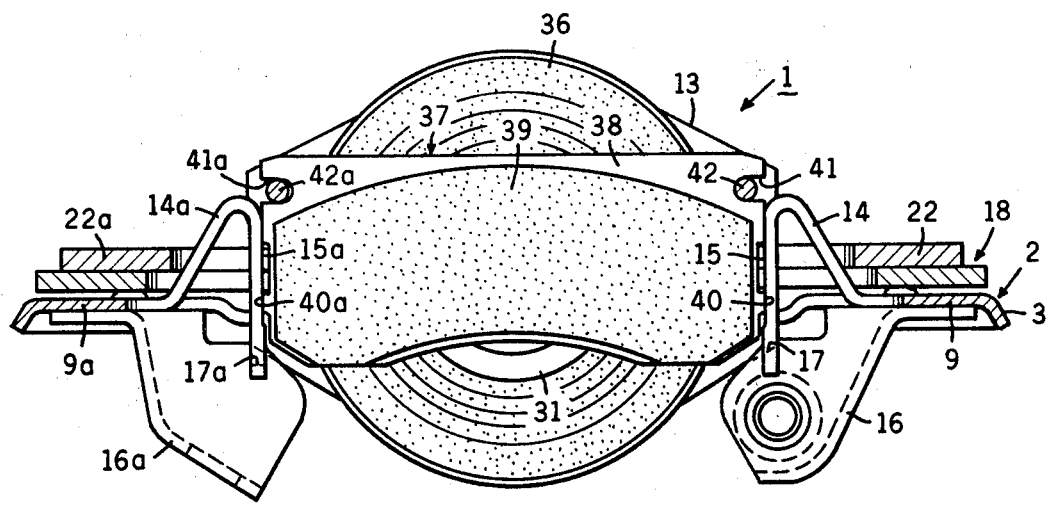
FIG. 4 is a sectional view taken along line 4–4 of FIG. 2.

Referring now to FIGS. 1—4 of the drawings in detail and in particular to FIG. 1, a friction device or disc brake 1 is provided with a supporting member 2 having a substantially flat or planar support plate 3 which extends across a chordal portion of a rotatable disc 4 having opposed inboard and outboard sides 5, 6. A generally T-shaped slot 7 is provided in the support plate 3 defining a support plate connecting portion 8 adjacent to the disc outboard side 6 and interconnected between opposed differential arms 9, 9a which extend over the periphery of the disc 4 to the inboard side 5 thereof. An axially extending slot 10 having opposed sidewalls or anchor surfaces 11, 11a is provided through the connecting portion 8, and the arms 9, 9a are respectively provided with opposed axially extending and circumferentially spaced guide surfaces 12, 12a for receiving an actuator or wheel cylinder 13, as discussed hereinafter. Referring now also to FIG. 4, opposed anchors 14, 14a are respectively integrally formed on the arms 9, 9a adjacent to the disc inboard side 5 having depending portions 15, 15a defining opposed anchor surfaces, and a pair of opposed, circumferentially spaced mounting brackets 16, 16a are respectively connected with said arms on said disc inboard side by suitable means, such as welds (not shown), for supporting or fixed connection with a nonrotatable vehicle portion (not shown). The mounting brackets 16, 16a are slotted at 17, 17a to receive the free ends of the anchor depending portions 15, 15a in supporting dovetailing engagement, respectively.

Figure 2:
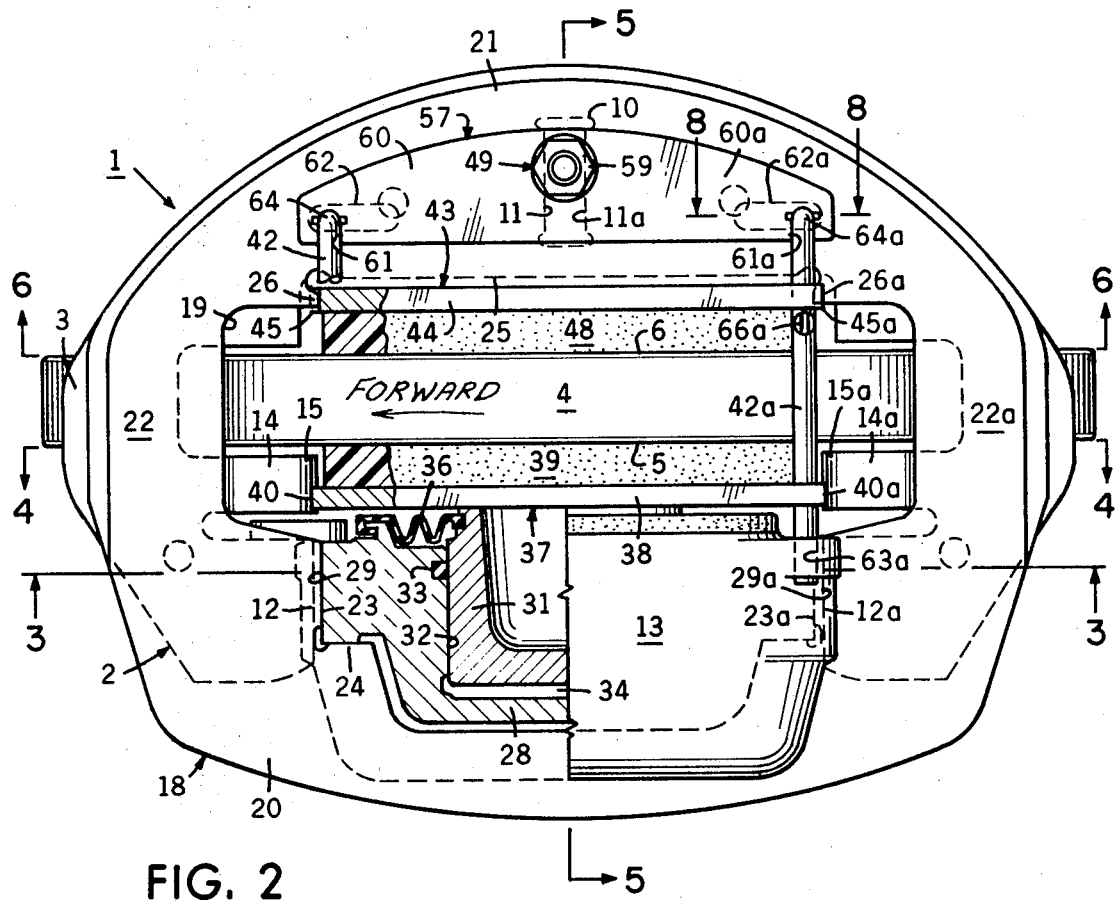
FIG. 2 is a plan view, partially in cross section, of the disc brake embodying the present invention.
Figure 3:
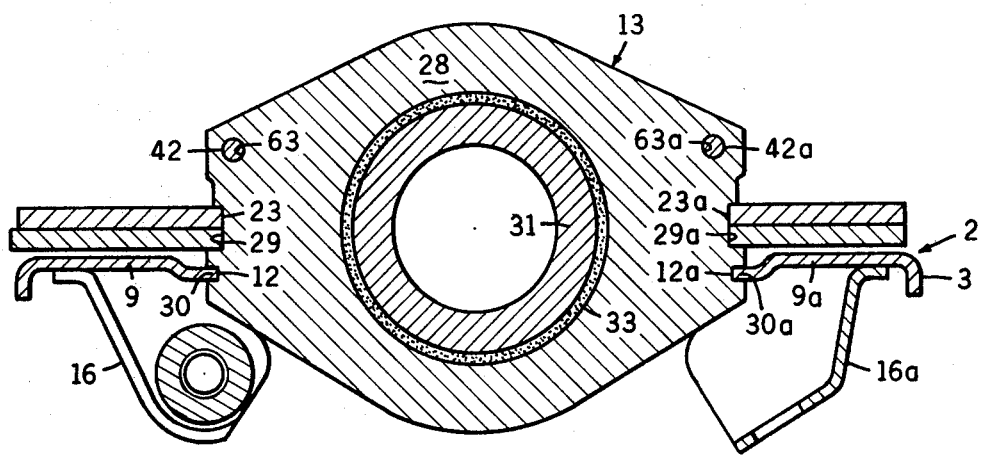
FIG. 3 is a sectional view taken along line 3–3 of FIG. 2.

Referring now to FIGS. 2, 3 and 5, a closed loop member or plate 18 is mounted for sliding axial displacement on the support plate 3 extending about a chordal portion of the disc 4, and a generally T-shaped opening 19 is provided in said loop member generally defining opposed reaction and frame portions 20, 21 on the disc inboard and outboard sides 5, 6 and opposed ends 22, 22a which extend over the periphery of the disc 4 being integrally interconnected between said reaction and frame portions. The T-shaped opening 19 defines opposed axially extending abutment surfaces 23, 23a interconnected by a drive or base surface 24 on the reaction portion 20 for engagement with the wheel cylinder 13, and a recess or groove 25 is provided on the frame portion 21 interconnecting with said T-shaped opening and having opposed side walls or abutments 26, 26a. The frame 21 of the loop member 18 is also provided with a vertical stepped slotted aperture 27 therethrough in axial alignment and overlapping relation with slot 10 in the connection portion 8 of the support plate 3 for anchor pin receiving purpose, as discussed hereinafter, and said slotted aperture is provided with opposed sidewalls 27a, 27b.

The wheel cylinder 13 is provided with a housing 28 having opposed grooves 29, 29a and 30, 30a therein, and the reaction portion abutments 23, 23a are received in press-fitting engagement in the grooves 29, 29a with said housing in driving engagement with the drive surface 24. The housing grooves 30, 30a slidably and guidingly receive the guide surfaces 12, 12a of the support plate 3. A piston 31 is slidably received in a blind bore 32 provided in the housing 28 in sealing engagement with a seal 33 carried in said blind bore, and the interior end of said piston defines with said blind bore an expansible fluid pressure chamber 34 connected in pressure fluid communication with an inlet port 35 also provided in said housing. A resilient boot 36 is connected between the housing 28 and the exterior end of the piston 31 to prevent the entry of foreign particles into the bore 32, and said piston is drivingly engaged with an inboard brake shoe 37.

The inboard brake shoe 37, FIGS. 2, 4 and 5, is provided with a metallic pad 38 having friction material or brake lining 39 bonded thereto for frictional engagement with the disc inboard side 5, and opposed abutments or anchoring ends 40, 40a are provided on said pad in sliding anchoring engagement with the anchor surfaces 15, 15a of the support plate 3. The pad 38 is also provided with opposed guide grooves 41, 41a in the ends 40, 40a thereof for guiding and vertical displacement preventing engagement with a pair of shoe guide rods 42, 42a to be discussed hereinafter.

An outboard brake shoe 43, FIGS. 2, 5 and 6, is provided with a metallic pad 44 which is received in the frame recess 25 of the loop member 18, and opposed ends 45, 45a are provided on said pad having opposed retaining grooves 46, 46a and opposed guide grooves 47, 47a therein, respectively. The retaining grooves 46, 46a are received on the loop member frame portion 21 in abutting engagement with the sidewalls 26, 26a of the frame recess 25, and the opposed guide grooves 47, 47a are provided for displacement preventing engagement with the guide rods 42, 42a. Another friction material or brake lining 48 is bonded onto the pad 44 for frictional engagement with the disc outboard side 6.

An outboard anchor member or pin, indicated generally at 49 in FIGS. 5 and 7, is provided with a head 50 integrally formed on one end of stepped hubs 51, 52 which have a shoulder 53 therebetween, and opposed flats 54, 54a are provided on said stepped hubs. A shank 55 is integrally formed on the other end of the stepped hubs 51, 52 having a free end threaded at 56. The anchor pin head 50 is slidably engaged with the lower or bottom side of the support plate connecting portion 8 about the axial slot 10 therethrough, and the larger stepped hub 51 extends through said axial slot with the opposed flats 54, 54a in sliding engagement with the opposed sidewalls 11, 11a of said axial slot and in rotation preventing engagement with the sidewalls 27a, 26b of the slotted aperture 27 in the loop member 18. The lower or bottom side of the loop member frame 21 is engaged with the anchor pin shoulder 53 to predeterminately space the loop member 18 from the support plate 3, and the smaller stepped hub 52 and shank 55 extend through the vertical stepped bore 27 in the loop member frame 21. A retainer plate 57 is provided in abutting engagement with the upper or top side of the loop member frame portion 21 having an opening 58 therein which receives the anchor pin shank 55, and a lock nut 59 is threadedly received on the threaded end 56 of said shank in displacement preventing engagement with said retainer plate 57.

Referring now to FIGS. 2, 4 and 8, the retainer plate 57, FIG. 2, is provided with a pair of opposed extensions 60, 60a having a pair of axially extending recesses or open-ended slots 61, 61a therein substantially in axial alignment with the guide grooves 41, 41a and 47, 47a of the inboard and outboard pads 38, 44, respectively, and another pair of opposed retaining slots 62, 62a are provided through the loop member frame portion 21 overlapping said open-ended slots and substantially normal thereto. The wheel cylinder housing 28 is provided with a pair of axially extending apertures 63, 63a in which one of the ends of the guide rods 42, 42a are slidably and rotatably received, and the intermediate or midportions of said rod extend axially across the periphery of the disc 4 and in sliding and rotatable engagement with the guide grooves 41, 41a and 47, 47a of the inboard and outboard shoes 38, 44, respectively. The outboard end portions 64, 64a, FIGS. 2 and 8, of the guide rods 42, 42a depend therefrom and are rotatable in vertical planes into the position shown in the drawings in abutting axial displacement engagement between the opposed sidewalls of the retaining slots 62, 62a and projections 66, 66a are provided on the guide rods 44, 44a on the intermediate portions thereof for respective engagement with the outboard pad 44 to maintain said outboard pad against axial displacement from the recess 25 in the frame portion 21 of the loop member 18.

In the operation with the disc 4 rotating in the forward direction, as indicated by the directional arrow in FIG. 2, fluid pressure is selectively applied to the wheel cylinder chamber 34 through the inlet port 35, and the applied fluid pressure acts on the effective area of the piston 31 in said chamber to establish a force urging said piston in a friction device energizing direction toward the disc inboard side 5. Since the exterior end of the piston 31 is drivingly engaged with the pad 38, the established force concertedly drives said piston and pad to urge the lining 39 into frictional engagement with the disc inboard side 5 to retard rotation of the disc 4. The friction device applying movement of the inboard brake shoe 37 is guided by the cooperative sliding engagement of the guide slots 41, 41a thereof on the guides 42, 42a and the sliding engagement of the shoe ends 40, 40a on the support plate anchor surfaces 15, 15a, respectively.

The torque of the frictional engagement between the lining 39 and the disc inboard side 5 is transmitted from said lining through the pad 38 and the anchoring surface 15 of the anchor 14 into the support plate 3 directly to the mounting bracket 16. Of course, the engagement between the inboard shoe ends 40, 40a and the anchor surfaces 15, 15a as well as the engagement of the inboard shoe guide grooves 41, 41a with the guides 42, 42a prevents vertical displacement of the inboard shoe 37 in response to the braking torque established upon the frictional engagement of said shoe with the disc inboard side 5.

At the same time, the applied fluid pressure in the wheel cylinder chamber 34 also acts on the effective area of the wheel cylinder 13 in said chamber to establish a reaction force for concertedly moving said wheel cylinder, the loop member 18, and the outboard brake shoe 43 in a friction device energizing direction opposite to that of the piston 31 and inboard brake shoe 37. The movement of the wheel cylinder 13 in the opposite direction is guided by the sliding engagement of the wheel cylinder grooves 30, 30a on the support plate surfaces 12, 12a and by the sliding engagement of the opposed flats 54, 54a of the anchor pin 49 on the anchor surfaces 11, 11a of the support plate slot 10. The reaction force effecting the movement of the wheel cylinder 13 in the opposite direction is transferred through the driving engagement of the wheel cylinder housing 28 and the driven surface 24 of the loop member reaction portion 20 directly to the loop member 18 to effect the concerted movement in the opposite direction of the outboard brake shoe 43 urging the lining 48 thereof into frictional engagement with the disc outboard side 6 to retard rotation of the disc 4 at substantially the same time the lining 39 is engaged with the inboard disc side 5, as previously discussed. The torque of the frictional engagement between the lining 48 and the disc outboard side 6 is transferred from said lining to the pad 44 and therefrom to the loop member 18 through the engagement of the pad end 46 with the recess sidewall 26 in the frame portion 21 of the loop member 18. Due to the anchoring engagement of the outboard anchor pin 49 between the support plate 3 and the loop member 18, the torque of the frictional engagement between the outboard shoe 43 and the disc outboard side 6 is transferred from said loop member to the anchor pin smaller hub and shank 52, 55 urging the flat 54 on the anchor pin larger hub 51 into anchoring engagement with the sidewall 11 of the support plate slot 10 thereby transferring the torque to the support plate. In this manner, the torque so transferred to the connecting portion 8 of the support plate 3 is further transferred therefrom through the support plate arms 9, 9a directly to the mounting brackets 16, 16a.

It should be noted that the torque established between the outboard shoe 43 and the disc outboard side 6 upon the frictional engagement thereof establishes a force component substantially in the plane of the frictional engagement acting in the forward direction and having a moment which tends to twist the loop member 18 in a counterclockwise direction; however, this twisting moment or force is resisted by the outboard anchor pin 49 being distributed or transferred thereby to the support plate 3 and the mounting brackets 16, 16a, as previously discussed with regard to the braking torque of the outboard shoe 43. In this manner, it is obvious that the aforementioned twisting moment acting on the loop member 18 is substantially obviated by positioning the anchor pin 49 in anchoring engagement between the support plate 3 and said loop member adjacent to the outboard shoe 43 or the outboard portion of the friction device. The substantially rigid interconnection between the support plate 3 and the loop member 18 between the outboard connecting and frame portions 8, 21 thereof provided by the anchor pin 49 effects a resistance to the twisting moment which, of course, substantially obviates undesired tapered wear on the lining 48 of the outboard shoe 43.

It should also be noted that the shoes 37, 43 are easily disassembled from the brake 1 upon the removal of the nut 59 from the anchor pin 49 which permits the vertical displacement thereof from engagement between said support plate and loop member, and such ease of disassembly is a desirable feature for repair purposes. For instance, upon vertical displacement of the anchor pin 49, the retainer plate 57 is then freely movable in the outboard direction to displace the open-ended slots 61, 61a thereof from rotative displacement preventing engagement with the outboard end portions 64, 64a of the guide rods 42, 42a, and said outboard end portions are thereafter rotatable in the horizontal plane toward free positions displaced from axial displacement preventing engagement with the opposed sidewalls of the loop member slots 62, 62a. With the rod outboard ends 64, 64a rotated toward their free positions, the projections 66, 66a are also displaced to rotated positions permitting the axial movement thereof through the outboard shoe guide grooves 47, 47a when the rods 42, 42a are manually moved axially in the outboard direction to disengage the inboard ends thereof from the wheel cylinder guide bores 63, 63a. When the inboard ends of the guide rods 42, 42a are disengaged from the wheel cylinder guide bores 63, 63a, said rods are then, of course, movable out of engagement with the guide grooves 41, 41a and 47, 47a of the inboard and outboard shoes 37, 43 to permit removal of said inboard shoe radially outwardly of the brake assembly 1. With the inboard shoe 37 so removed, the loop member 18 is manually movable on the support plate 3 in the outboard direction to permit the pad 44 of the outboard shoe to be moved axially toward the disc outboard side 6 toward a position disengaging the retaining grooves 46, 46a from the recess sidewalls 26, 26a, and thereafter the outboard shoe is also removable from the brake 1 in the radially outward direction.

From the foregoing, it is now apparent that a novel disc brake 1 meeting the objects and advantageous features set forth hereinbefore, as well as others, is provided and that changes as to the precise configurations, shapes and details of the construction set forth in the disclosure by way of illustration may be made by those skilled in the art without departing from the spirit of the invention.

I claim: the embodiments of the invention in which an exclusive property or privilege are defined as follows:

1. A friction device for use with a rotatable disc comprising a pair of relatively movable members extending about substantially a chordal portion of said disc, opposed mounting means on one of said members and adjacent to one side of said disc for connection with a nonrotatable vehicle mounting portion, a pair of opposed anchors on said one member adjacent to said disc one side, a friction element for frictional engagement with said one disc side and embraced by said anchors, actuating means movable on said one member and drivingly engaged between the other of said members and said friction element, another friction element connected in torque transmitting engagement with said other member for frictional engagement with the other side of said disc, said actuating means being movable to drive said first named friction element and said other member in opposite directions and frictionally engage said first named and other friction elements with said disc one and other sides, respectively, the torque of the frictional engagement of said first named friction element being transferred to one of said anchors, and anchor means connected between said members adjacent to said disc other side for transmitting the torque of the frictional engagement of said other friction element to said mounting means.

2. A friction device according to claim 1, wherein said anchor means includes an anchor pin extending through said members for transferring the torque of said other friction element from said other member to said one member.

3. A friction device according to claim 2, comprising a driving connection between said other member and said anchor pin, said other member and anchor in being concertedly movable in response to the actuation of said actuating means, and said anchor pin being slidably received in said one member.

4. A friction device according to claim 3, comprising slot means in said one member adjacent to said disc other side, said anchor pin being slidable in said slot means in torque transferring relation with said one member.

5. A friction device according to claim 4, wherein said slot means includes opposed sidewalls, and opposed flats on said anchor pin respectively slidably engaged with said sidewalls for transferring the torque of said other friction element to said one member.

6. A friction device according to claim 3, comprising aperture means in said other member adjacent to said disc other side including opposed sidewalls, said anchor pin extending through said aperture means, and opposed flats on said anchor pin and engaged with said sidewalls to substantially obviate rotation of said anchor pin relative to said members.

7. A friction device according to claim 6, comprising slot means in said one member adjacent to said disc other side and aligned with said aperture means, said anchor pin being slidably received in said slot means in torque transferring relation with said one member.

8. A friction device according to claim 7, wherein said slot means include opposed sidewalls, said opposed flats also being slidable on said sidewalls in torque transferring engagement therewith, respectively.

9. A friction device according to claim 7, wherein said slot means include opposed sidewalls, said opposed slots being slidable in said sidewalls in torque transferring engagement therewith, a head portion on said anchor pin and slidable on said one member about said slot means, a shoulder on said anchor pin and predeterminately spaced from said head portion, and means connected between said anchor pin and said other member urging said other member toward engagement with said shoulder and urging said head portion toward engagement with said one member.

10. A friction device according to claim 4 comprising a head portion on said anchor pin and slidable on said one member about said slot means, a shoulder on said anchor pin and predeterminately spaced from said head portion, and means connected between said anchor pin and said other member urging said other member toward engagement with said shoulder and urging said head portion toward engagement with said one member.

11. A friction device according to claim 1, comprising stepped aperture means in said other member on said disc other side, the larger of said stepped aperture means including opposed axially extending sidewalls, slot means in said one member substantially in vertical alignment with said aperture means and including other opposed axially extending sidewalls, said anchor means including an anchor pin extending through said aperture means and slot means, a head portion on said anchor pin slidable on said one member about said slot means, opposed flats on said anchor pin, said opposed flats being slidably engaged with said other opposed sidewalls to transfer the torque of said other friction element to said one member, said opposed flats also being engaged with said first named opposed sidewalls to prevent rotation of said anchor pin relative to said members, a shoulder on said anchor pin predeterminately spaced from said head portion, and a reduced shank portion on said anchor pin extending through the smaller of said stepped aperture means and having a threaded free end portion adjacent to said other member, and other means threadedly received on said free end portion and drivingly connected with said other member to urge said other member toward engagement with said shoulder and urge said head portion toward engagement with said one member.

12. A friction device according to claim 1, wherein said one member includes a support plate having a connecting portion adjacent to said disc other side, opposed arms connected with said connecting portion and extending across the periphery of said disc toward said disc one side, said mounting means and anchors being respectively connected with said arms, opposed guide means on said arms embracing said actuating means for guiding engagement therewith, said actuating means being movable in said guide means and said arms to energize said friction device, and slot means in said connecting portion, said anchor means being slidable in said slot means to transmit the torque of said other friction element to said support plate.

13. A friction device according to claim 1, wherein said other member includes a frame adjacent to said disc other side, said other friction element being connected with said frame, opposed end portions respectively connected with said frame and extending over the periphery of said disc, a reaction portion on said disc one side connected between said end portions, said actuating means being drivingly engaged between said first named friction element and said reaction portion, and aperture means in said frame, said anchor means being received in said aperture means in torque transferring engagement with said frame.

14. A friction device according to claim 1, wherein said one member includes a support plate having a connecting portion adjacent to said disc other side, opposed arms connected with said connecting portion and extending across the periphery of said disc toward said one disc side, said mounting means and anchor means being respectively connected with said arms, opposed guide means on said arms embracing said actuating means for guiding engagement therewith, said actuating means being movable on said guide means to energize said friction device, and slot means in said connecting portion, said other member including a frame portion adjacent to said disc other side, said other friction element being connected in torque transmitting engagement with said frame portion, opposed end portions respectively connected with said frame portion and extending over said disc periphery, a reaction portion on said disc one side connected between said end portions, said actuating means being drivingly engaged between said first named friction element and said reaction portion, and aperture means in said frame portion and substantially aligned with said slot means, said anchor means being received in said aperture means in torque transferring engagement with said frame portion and slidable in said slot means in torque transferring engagement with said support plate.

15. A friction device for use with a rotatable disc comprising a support plate extending about substantially a chordal portion of said disc including a portion adjacent to one side of said disc, mounting means on said support plate adjacent to the other side of said disc for connection with a nonrotatable vehicle mounting portion, and a pair of opposed anchor means on said support plate adjacent to said disc other side, a friction element for frictional engagement with said disc other side and slidably engaged between said anchor means, a closed loop member surrounding a chordal portion of said disc and movable on said support plate including fluid pressure responsive actuating means drivingly engaged between said member and friction element, and another friction element connected to torque transferring engagement with said member adjacent to said disc one side for frictional engagement therewith, said actuating means being responsive to fluid pressure applied thereto to move said first named friction element in one direction into frictional engagement with said disc other side and to move said member in the opposite direction to frictionally engage said other friction member with said disc one side, the torque of the frictional engagement of said first named friction element being transferred directly to one of said anchor means, and third anchor means connected between said member and said support plate portion adjacent to said disc one side for transmitting the torque of the frictional engagement of said other friction element from said member through said support plate directly to said mounting means.

16. A disc brake for use with a rotatable disc comprising support means, a pair of friction elements adjacent to the opposed sides of said disc for frictional engagement therewith, other means movable on said support means including actuating means on one side of said disc for urging one of said friction elements into engagement with said one disc side and frame means on the other side of said disc for urging the other of said friction elements into engagement with said disc other side, a pair of aperture means in said actuating means, a pair of holding means extending across the periphery of said disc and engaging said friction elements to limit displacement movement of at least one of said friction elements radially of said disc, opposed end portions on said holding means, one of the end portions of said holding means being axially and rotatably movable in said aperture means, the other end portions of said holding means being displaced in a plane substantially normal to those of said one end portions, slot means in said frame means for engagement with said other end portion to limit axial displacement of said holding means, said holding means being rotatable in said aperture means toward a position engaging said other end portions in said slot means, and other means removable secured to said frame means and engaged with said other end portions to maintain said other end portions against rotative displacement from engagement with said slot means.

17. A disc brake according to claim 16, comprising a pair of recess means in said other means, said other end portions extending through said recess means.

18. A disc brake according to claim 16, comprising first and second pairs of opposed groove means in said friction elements, respectively, said holding means being received in said first and second pairs of groove means in engagement with said friction elements to limit displacement movement of said one friction element radially of said disc, respectively, a recess in said frame means, the other of said friction elements being received in said recess, and a pair of abutment means on said holding means for engagement with said other friction element about one of said first and second pairs of groove means to prevent the displacement thereof from said recess, said abutment means being rotatable with said holding means toward positions aligned with said one of said first and second pairs of groove means to permit axial displacement movement of said holding means therethrough.

19. A friction device for use with a rotatable disc comprising support means and movable means each extending substantially about a chordal sector of said disc, said support means being mounted adjacent to one of the opposed sides of said disc and said movable means being axially movable relative to said disc on said support means, at least one friction member mounted in torque transfer relation with said movable means and movable therewith toward frictional engagement with the other of the opposed sides of said disc, and anchor means connected between said support means and movable means adjacent to said disc other opposed side for transmitting the torque of the frictional engagement between said one friction member and said disc other opposed side from said movable means to said support means.

20. A friction device for use with a rotatable disc comprising support means and movable means each extending substantially about a chordal sector of said disc, said support means being mounted adjacent to one of the opposed sides of said disc and said movable means being movable on said support means, a pair of friction members for frictional engagement with said disc opposed sides, respectively, said movable means including an actuator portion and another portion drivingly engaged with said friction members to urge said friction members into frictional engagement with said disc opposed sides upon the actuation of said actuator portion, respectively, and anchor means connected between said support and movable means adjacent to the other side of said disc to transfer to said support means the torque of frictional engagement transmitted to said movable means from the friction member engaged with said disc other side.

21. A friction device for use with a rotatable disc comprising support means and movable means each extending substantially about a chordal sector of said disc, said support means being mounted adjacent to one of the opposed sides of said disc and said movable means being axially movable relative to said disc on said support means, a pair of friction members for frictional engagement with said disc opposed sides, said movable means including an actuator portion and another portion drivingly engaged with said friction members to effect movement thereof into frictional engagement with said disc opposed sides upon the actuation of said actuator portion, respectively, means for transmitting the torque of frictional engagement between one of said friction members and the other of the opposed sides of said disc to said movable means, and other means connected with one of said support means and movable means and in anchoring engagement with the other of said support means and movable means adjacent to said disc other opposed side for transmitting the torque of friction engagement from said movable means to said support means.

22. A brake for use with a rotatable disc comprising support means adapted to be mounted adjacent to one of the opposed sides of said disc, a pair of brake shoes for friction engagement with said disc opposed sides, means defining a closed loop substantially about a chordal sector of said disc and axially movable on said support means for urging said brake shoes into frictional engagement with said disc opposed sides, at least one guide means extending across the periphery of said disc and engaged with said brake shoes including opposed end portions, one of said end portions being movably connected against displacement with said loop means adjacent to said disc one opposed side, the other of said end portions extending generally in a plane different that that of said one end portion, slot means in said loop means adjacent to the other of the opposed sides of said disc, said one end portion being rotatable in said loop means adjacent said disc one opposed side toward a position engaging said other end portion in said slot means, and other means connected between loop means adjacent to said disc other opposed side and said other end portion to maintain said other end portion against rotative displacement from said slot means.

23. A brake according to claim 22, wherein said loop means includes an actuator portion and an opposed member respectively adjacent to said disc one and other opposed sides and engaged with said brake shoes to effect the movement thereof into frictional engagement with said disc opposed sides upon the actuation of said actuator portion, said one end portion of said guide means being axially and rotatably received in said actuator portion.

24. A brake according to claim 23, comprising aperture means in said actuator portion, said one end portion of said guide means being axially and rotatably movable in said aperture means.

25. A brake according to claim 24, comprising a pair of groove means in said brake shoes, respectively, said guide means including an intermediate portion integrally interconnected between said opposed end portions and received in guiding and displacement preventing engagement with said groove means.

26. A brake according to claim 24, comprising other slot means in said other means and positioned in overlaying relation with said first named slot means when said other means is connected with said loop means, said other end portion extending through said other slot means in rotative displacement preventing engagement therewith into said first named slot means.

27. A brake according to claim 22, comprising groove means in each of said brake shoes, said guide means being received in said groove means.

28. A brake according to claim 22, wherein said other means includes other slot means normally positioned in overlaying relation with said first named slot means, said other end portion extending through said other slot means into said first named slot means.

29. A brake according to claim 22, comprising extension means on said guide means spaced from said other end portion and normally engaged with one of said brake shoes adjacent to said disc other opposed sides to prevent movement of said one brake shoe relative to said loop means toward said disc other opposed side.